United States Patent [19]
Prater et al.

[11] Patent Number: 5,383,609
[45] Date of Patent: Jan. 24, 1995

[54] METHOD FOR PULVERIZATION OF VEGETABLE FIBER MATERIALS AND ITS PRESSURE ROLLER SYSTEM

[75] Inventors: Robert W. Prater, Burr Ridge, Ill.; Jun Ohashi, Isehara, Japan

[73] Assignee: Prater Industries, Inc., Chicago, Ill.

[21] Appl. No.: 39,952

[22] Filed: Mar. 30, 1993

[30] Foreign Application Priority Data
Apr. 17, 1992 [JP] Japan ................... 4-097856

[51] Int. Cl.⁶ ............... B02C 4/08; B02C 4/28
[52] U.S. Cl. ..................... 241/29; 241/222; 241/229
[58] Field of Search ........... 241/229, 230, 231, 234, 241/29, 24, 132.2, 222, 224

[56] References Cited
U.S. PATENT DOCUMENTS

| | | | |
|---|---|---|---|
| 1,463,238 | 7/1923 | Baccellieri | 241/230 |
| 4,484,377 | 11/1984 | Morel | 241/29 X |
| 4,807,819 | 2/1989 | Kreher et al. | 241/222 |

*Primary Examiner*—Douglas D. Watts
*Attorney, Agent, or Firm*—Lee, Mann, Smith, McWilliams, Sweeney & Ohlson; John M. Mann

[57] ABSTRACT

The manufacture of fine powder from vegetable fiber materials at relatively low cost and without contamination, wherein the manufacturing system involved is equipped with a pressure roller system having a couple of pressure rollers, each having teeth of wave-shaped cross section and teeth bottoms, with both such rollers being placed opposite to each other with a minimal space in between same and arranged for synchronous revolution, and with the present invention comprising such processes as to pressure feed the vegetable fiber raw materials to said pressure roller system to mill the aforesaid raw materials with such pressure roller system, and after multiple repetition of said milling process, to pulverize flaked raw materials resulting from the aforesaid milling process with a flake breaker.

3 Claims, 4 Drawing Sheets

METHOD FOR PULVERIZATION OF VEGETABLE FIBER MATERIALS AND ITS PRESSURE ROLLER SYSTEM

The present invention is directed to the manufacture of fine powder from vegetable fiber materials at relatively low cost and without contamination, and concerns a method for pulverization of vegetable fiber materials including their leaves and stems under normal temperature without affecting their quality and a pressure roller system directly used for such a method.

Leaves and stems of vegetables such as mugwon, green tea, mulberry, coltsfoot, striped bamboo, chrysanthemum coronarium, pefilla, houttuymia cordata, leek, etc. are pulverized and used as food additives (including natural coloring materials) and medicines. To be served as medicines. flavors or spices, those vegetables should desirably be pulverized at a temperature below 40° C. so that their essential oil content does not vaporize. Furthermore, treatment under the above temperature would least affect the colors inherent in those vegetables. There are several methods currently available to fill such conditions as described below:

1. One of such methods is to utilize $LN_2$: (liquid nitrogen). Vegetable fiber materials frozen with $LN_2$ to enhance their fragility is thrown into a hammer mill equipped with a hammer of circumferential speed of 80-120 m/sec to pulverize.

This method incurs very high production cost, since the kg unit price of $LN_2$ is high and the process requires several times as much $LN_2$ as the raw materials. Furthermore, it requires a process to refreeze-dry once frozen vegetable fiber materials, which adds up production cost. Hence, application of this method is limited only to specialty products in view of such high production cost.

2. The second method is the ball mill process. This method, however, requires a long time to pulverize raw materials with the ball, owing to low crushing capacity of the ball mill, and furthermore, the heat generated from the impact of the ball could degrade quality of materials. At the same time, wear of the ball is conducive to contamination of processed material with foreign matters. For these shortcomings, this ball mill process is not suitable for pulvenzation of vegetable fibers.

3. The third method is the stone mill process; however, this method involves problems of heat generation and oxidation of materials rich in stem parts to harm their color, taste and/or flavor. Hence, it is not suitable for mass production of powder materials.

As stated above, such conventional methods and equipment used for pulverization of vegetable fiber materials have been unsatisfactory for high costs or degradation of materials due to heat generation or contamination.

The present invention is intended to offer a method for pulverization of vegetable fiber materials and a pressure roller system for it to resolve problems involved in the conventional methods, with lower production cost and minimal heat generation or contamination.

To accomplish the above mentioned objective, the present invention offers a method for pulvefization of vegetable fiber materials which is provided with a pressure roller system consisting of a couple of pressure rollers, each of which is equipped with teeth having waveshaped cross-section and teeth bottoms, and both pressure rollers being placed facing each other with a tooth of one roller being aligned with a tooth bottom of the other roller so as to define a minimal space in between and said rollers arranged to allow their synchronous revolution; said invention consists of such processes as to pressure-feed the aforesaid materials to said pressure roller system, to mill said aforesaid materials with the afore described pressure roller system, and after multiple repetition of milling with these rollers, to pulverize flake-formed materials resulting from this milling process with a flake breaker. More particularly and the pressure roller system to be used for this method comprises a couple of pressure rollers, each of which is equipped with teeth having similar wave-shaped cross-section and teeth bottoms, with such rollers being disposed so that the tooth, of one pressure roller is closely disposed with respect to the tooth bottom that is between two adjacent teeth of such other roller, and has such arrangements as to allow approach/separation of one such roller from the other roller involved, to apply back pressure to one of said rollers and to provide synchronous revolution of these pressure rollers. The present invention thus affords a process to pulverize vegetable fiber materials at low cost and in a simple manner under normal temperature with minimal heat generation or contamination to produce powder products of good quality.

Other objects, uses, and advantages will be obvious or become apparent from a consideration of the following detailed description and the application drawings in which like reference numerals indicate like parts throughout the several views.

Figure 1:
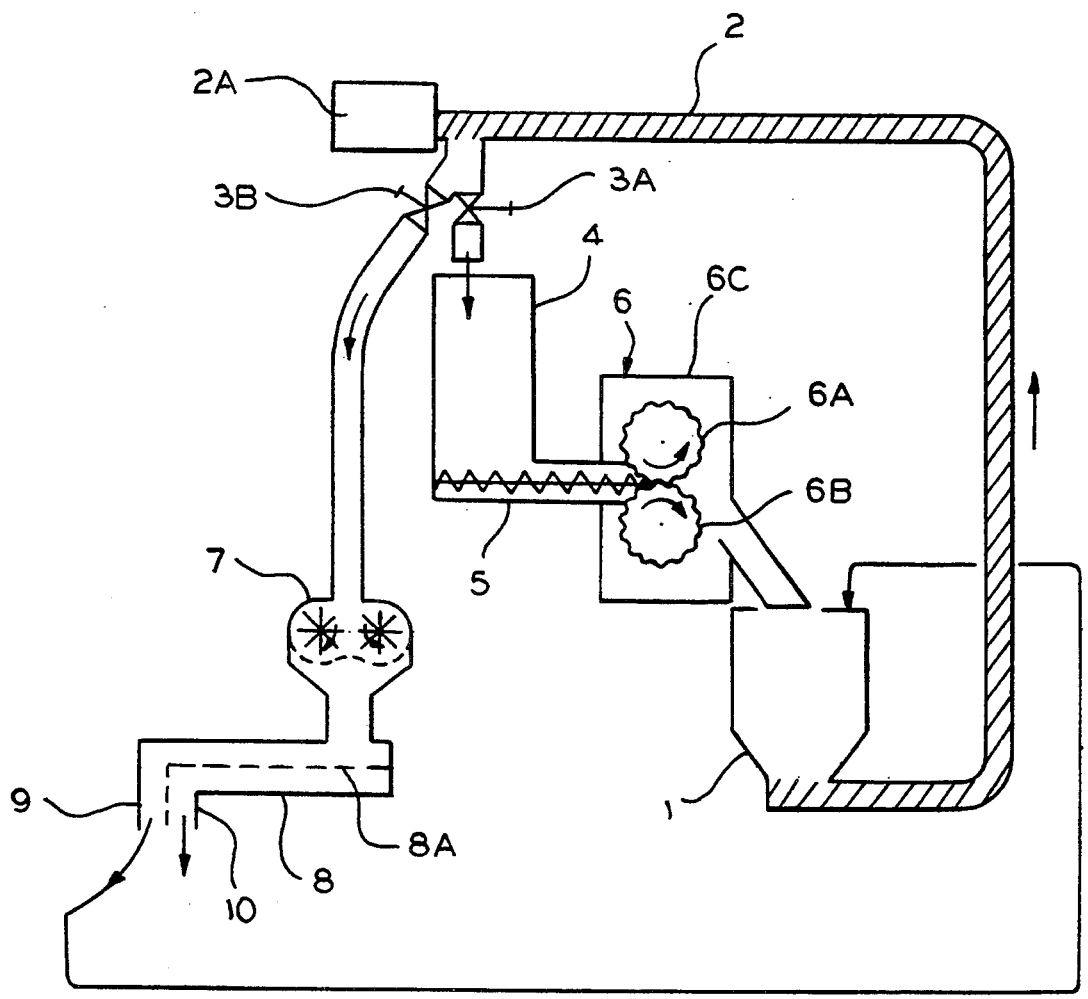
FIG. 1 is a simplified drawing of the system to perform the method for pulverization of vegetable fiber materials of the present invention.

| Drawing Reference Numerals | |
| --- | --- |
| 1 | Raw material tank. |
| 2 | Recycling conveyor |
| 3A, 3B | Valves |
| 4 | Hopper |
| 5 | Screw feeder |
| 6 | Pressure roller system |
| 6A, 6B | Pressure rollers |
| 7 | Flake breaker |

However, it is to be distinctly understood that the drawing illustrations reterred to are provided primarily to comply with the disclosure requirements of the Patent Laws, and that the invention is susceptible of modifications and variations that will be obvious to those skilled in the art, and that are intended to be covered by the appended claims.

DETAILED DESCRIPTION OF THE PREFERRED EMBODIMENT

This is to explain a typical application of the present invention with reference to the drawings. FIG. 1 shows a system to practice the invented method for pulverization of vegetable fiber materials. In this FIG. 1 shows the raw material tank, 2 recycling conveyor, 2A recycling conveyor drive system, 3A feed valve, 3B ejection valve, 4 hopper, 5 screw feeder or similar controlled pressure feeding system, 6 pressure roller system having pressure rolls 6A and 6B within housing 6C, 7 flake breaker, 8 sieve with screen 8A, and 9 outlet for the filtered remnant left on screen 8A, or product powder.

Figure 2:
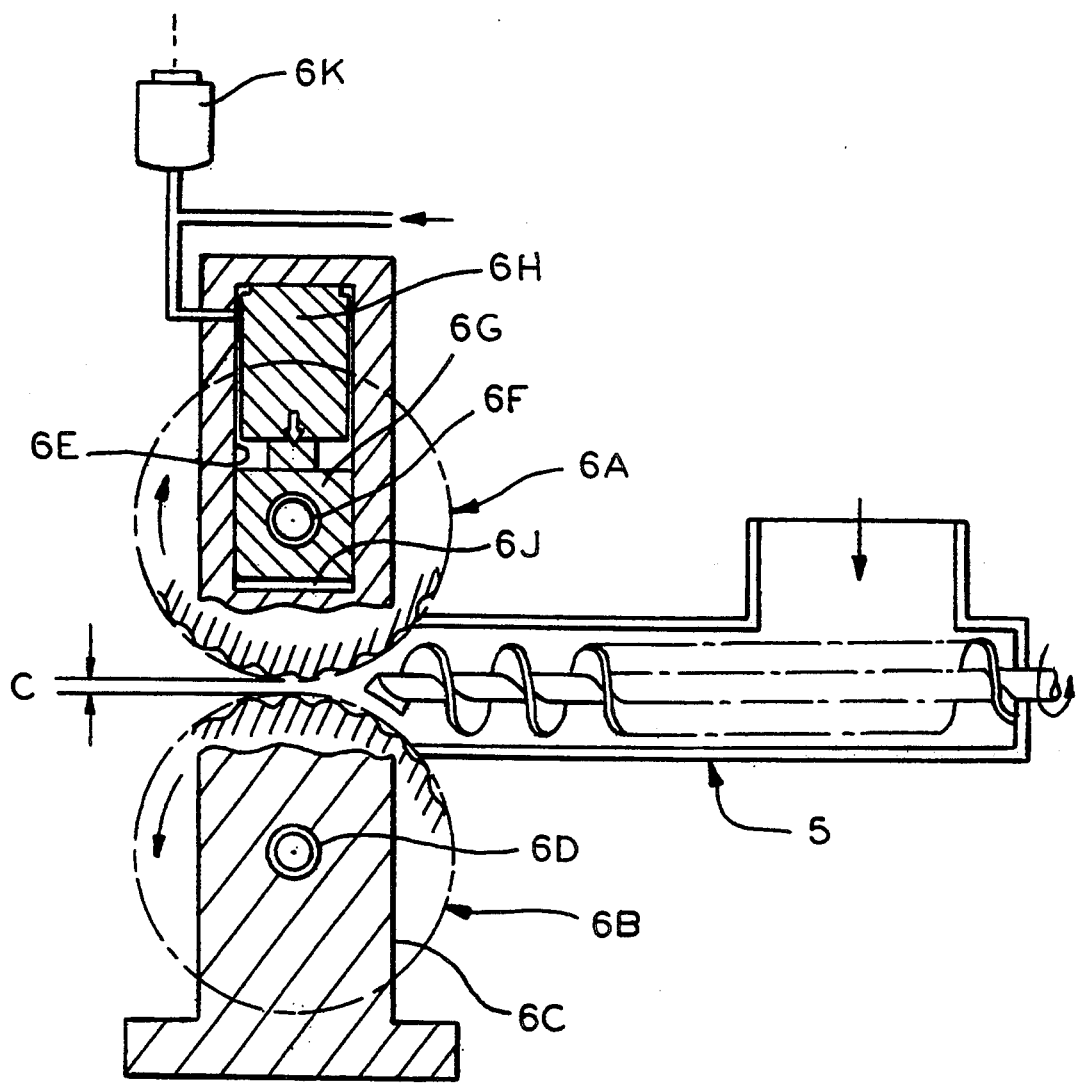
FIG. 2 is a detailed drawing of the pressure rollers in FIG. 1.

Next, let us explain the specific construction of the pressure roller system referring to 2 through 4 drawing figures hereof. Stand 6C holds bottom pressure roller 6B to allow its free rotation via fixed beating 6D. Formed on top of stand 6C is a lengthy groove 6E (see FIG. 2), which accommodates float 6G holding top pressure roller 6A to allow its free rotation via bearing 6F. Float 6G is given a back pressure as high as approximately eighteen (18) tons with hydraulic ram 6H. The circuitry of hydraulic ram 6H is equipped with accumulator 6K to provide buffer effect to alleviate the impact of back pressure.

Figure 3:
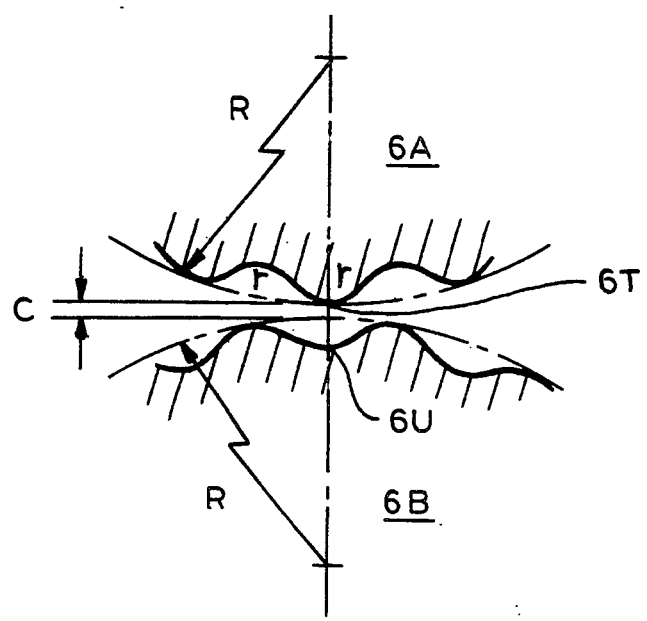
FIG. 3 is a magnified view of the engagement part of the couple of pressure rollers in FIG. 2.
Figure 4A:
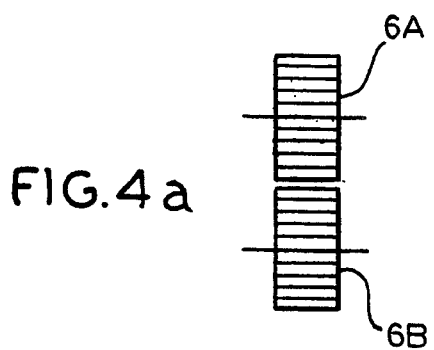
FIGS. 4a, 4b, and 4c are side views illustrating examples of wave-shaped teeth that may be provided the pressure rollers shown in FIG. 2.
Figure 4B:
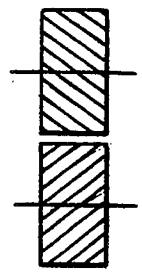
Figure 4C:
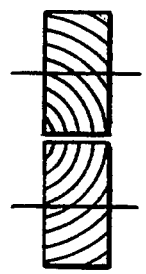

Both of top and bottom pressure rollers 6A and 6B have teeth of similar wave-shaped cross-section 6T and teeth bottoms 6U (see FIG. 3). The rotational directions and positions of those pressure rollers 6A and 6B are adjusted so that the top of a specific tooth of one roller 6T comes opposite to tooth bottom 6U of the other roller, and said pressure rollers perform synchronous revolution with a synchronization system (not shown in the drawing). Pressure rollers 6A and 6B are positioned, when stationary, opposite to each other with space C between an imaginary circumference of radius R of these rollers. Incidentally, space C can be adjusted with shim 6J (see FIG. 2). Wave-shaped teeth 6T and teeth bottom 6U of pressure rollers 6A and 6B, when viewed from their side, may be in shape of straight tooth gear, helical gear or curved helical gear as illustrated in FIGS. 4 (a) through (c). As an example, a set of rollers 6A and 6B may have such parameters as diameter 6 inches, number of teeth 72, pitch 0.2618 inches, teeth depth 0.063 inches, teeth top and teeth bottom r 3/64 inches, width 38 mm and space C 0.4 mm.

Flake breaker 7 in FIG. 1 has multiple number of ram impellers, which rotate at circumferential speeds of 10 to 60 m/sec to pulverize flake-formed raw material to produce powder product.

Next, let us explain an application of the pulverization method of the present invention utilizing the above mentioned pulverizing equipment. We used mugwort as a raw vegetable fiber material. This mugwort, which underwent such treatments after harvesting as drying, rough milling, sterilization, water-cleaning, drying up to water content of 10% maximum, is put into raw material tank 1. This raw material had been milled to a size of approximately 1 to 3 cm in the above mentioned rough milling stage. Feed valve 3A was kept open and ejection valve 3B kept closed in advance. Now, the raw material in tank 1 is transported with recycling conveyor 2 and fed into hopper 4 through feed valve 3A. The raw material put in hopper 4 is then fed at high pressure to pressure roller system 6 with screw feeder 5, the pressure-feeding mechanism. In the pressure roller system, the couple of pressure rollers that have wave-shaped teeth and rotate synchronously, compress the material at high pressure, and fatigue it with shearing force and mill its fibrous components. The milled material is compressed with said pressure rollers into wave-shaped flakes to be discharged from the space between the rollers and back into raw material tank 1. This one time milling process with pressure rollers 6 is insufficient, however, to pulverize the material into fine powder of small particle size. Therefore, flaked material is again fed into hopper 4 from raw material rank 1 with recycling conveyor 2, and pressure-fed to pressure roller system 6 with screw feeder 5, to perform the second milling process with the system. Likewise, aforesaid milling process is repeated over and over again until the material is pulverized to powder of sufficiently small particle size. To control the pulverization system in aforesaid milling process, two methods can be considered; one with screw feeder RPM, and the other with recycling time. The former control system works on such a principle; when RPM of pressure rollers is made constant, the bulk density of the material increases as the number of recycling times increases, which requires RPM of the screw feeder to drop to accommodate it. Therefore, utilizing this principle, this control system is designed to close valve 3A and open valve 3B when screw feeder RPM has dropped below a predetermined level, in which case it is desired to provide non-stop variable control of screw feeder RPM by means of making the drive torque of the pressure rollers, or the current level, constant. The latter method works with a preset recycling time, and is designed to close valve 3A and open valve 3B when that time has passed.

Thus, at the time the raw material is considered to have been sufficiently milled by the repetitive milling process, feed valve 3A is closed and ejection valve 3B is opened to take out the compressed and flaked material and feed it to flake breaker 7. At flake breaker 7, the flaked material is pulverized with its impellers that rotate at high speed, thereby producing fine powder. The powdered material is sieved with screening system 8, and the resultant fine powder of desired particle size comes out from discharge port 10. The residual material left on top of the sieve is discharged from port 9 and taken back to raw material tank 1 for repetitive milling process as required.

We have sought interrelation between the number of repetition of aforementioned milling process and the remnant on top of the sieve. An analysis of 88 micron-sized sieve-top residue with VAC-Screen particle analyzer made by Alpine Co. indicated the results shown in Table 1 below:

TABLE 1

| No. Repetition | Sieve-Top Residue |
| --- | --- |
| 1 Time | 90% |
| 2 Times | 75% |
| 3 Times | 73% |
| 4 Times | 69% |
| 5 Times | 53% |
| 6 Times | 51% |
| 7 Times | 43% |
| 8 Times | 40% |
| 9 Times | 28% |
| 10 Times | 17% |

Figure 5:
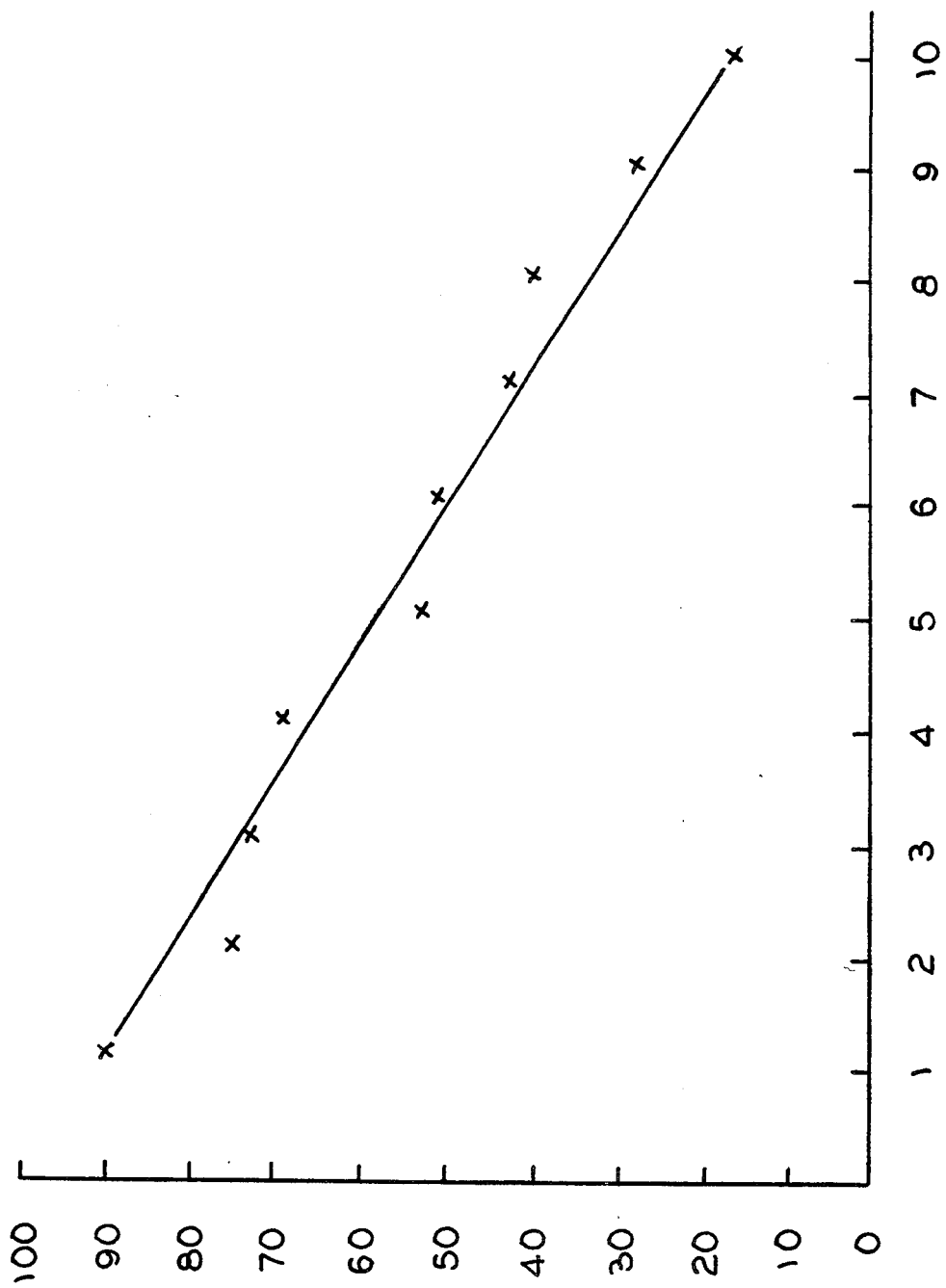
FIG. 5 is a graph showing the relationship between the number of repetition of milling process and the degree of pulverization of the present invention.

By plotting the results of Table 1, we have obtained a graph shown in FIG. 5. As evident from these results, in the case of mugwort, more than nine times repetition of milling process has produced fine powder of desired quantity. Likewise, similar results were also obtained with other vegetable fiber materials.

As has been explained thus far, comprising such processes as to pressure-feed vegetable fiber raw material, to mill such material with the pressure roller system and to pulverize the flaked raw material with the flake breaker after repetition of said milling process, the pulverizing method and the pressure roller system used therefor of the present invention are capable of producing fine powder material at relatively low cost without need for freeze milling or freeze drying process, and furthermore, for absence of heat generation or contamination, they provide powder product of good quality.

The foregoing description and the drawings are given merely to explain and illustrate the invention, and the invention is not to be limited thereto, except insofar as the appended claims are so limited, since those skilled in the an who have this disclosure before them will be able to make modifications and variations therein, without departing from the scope of the invention.

What is claimed is:

1. In a method for pulverization of vegetable fiber materials,
   a milling procedure therefor comprising:
   shaping said materials into compressed flakes by controlled force feeding said materials between a pair of adjacently disposed, synchronously and oppositely rotating, pressure rollers shaped at their respective circumferences to form said materials into said flakes, with the direction of rotation of such pressure rollers, respectively, being such that the adjacent portions of said adjacent portions of said circumferences of said pressure rollers move substantially in said direction, and,
   after multiple repetitions of said shaping step,
   pulverizing the resulting flakes into powder form.

2. In a method for pulverization of vegetable fiber materials:
   a milling procedure therefor, comprising:
   conveying of said materials between a tank therefor and a hopper therefor,
   controlled force feeding the materials supplied to said hopper between a pair adjacently disposed, synchronously and oppositely rotating, crusher rollers shaped at their respective circumferences to form such materials supplied to said hopper into compressed flakes, with the direction of rotation of such crusher rollers, respectively, being such that the adjacent portions of such crusher roller circumferences move substantially in said direction,
   and discharging said flakes into said hopper for recycling of same through and between said crusher rollers,
   and after multiple repetitions of said conveying, force feeding, and discharging steps,
   pulverizing the resulting flakes into powder form.

3. Apparatus for pulverization of vegetable fiber materials, comprising:
   a tank for receiving such vegetable fiber materials that are to be pulverized,
   a hopper positioned in spaced relation to said tank;
   means for conveying such materials from said tank into said hopper;
   means for controlled force feeding such materials from said hopper to and between a pair of adjacently disposed, synchronously and oppositely rotating, crusher rollers shaped at their respective circumferences to form such materials slipplied to said hopper into compressed flakes,
   means for discharging said flakes into said hopper for recycling through said force feeding means, and,
   means for pulverizing said flakes into powder form including means for rendering said pulverizing means operable when said flakes have achieved a predetermined degree of compression.

* * * * *